United States Patent Office 3,506,599
Patented Apr. 14, 1970

3,506,599
FOAMING ACID-CURABLE PLASTICS
Robert B. Dean, Bainbridge, N.Y., assignor to Borden, Inc., New York, N.Y., a corporation of New Jersey
No Drawing. Filed July 24, 1963, Ser. No. 297,202
Int. Cl. C08f 47/10; C08j 1/24
U.S. Cl. 260—2.5                3 Claims

ABSTRACT OF THE DISCLOSURE

The invention relates to foaming amine aldehyde resins or phenol aldehyde resins using ammonium fluosilicate and aluminum coated aluminum flakes as the foaming agent.

---

This invention relates to foaming resinous materials by generation of gas therewithin.

There has been proposed and used heretofore various means for introducing bubbles of gas into a resin at the time of setting thereof, so as to give a lightweight foamed product. One process involved generation of hydrogen by reaction of a metal with an acid, preferably a strong acid. Metals that have been used heretofore for this purpose include iron and zinc.

With the use of iron, however, there is the difficulty of staining due to the color of iron compounds. With zinc there is required a relatively large weight, approximately 37.7 parts of a more expensive metal for 1 part of hydrogen generated. The substitution of aluminum, with its absence of staining and its low equivalent weight, approximately 9, is an obvious substitution. It has been found, however, that aluminum does not react readily, even with such strong acid as hydrochloric, to liberate hydrogen during curing of a resin, in amount to foam the resin.

I have now discovered a process of causing the aluminum to react by the use of an acid which, while strong, is not as strong as hydrochloric acid.

Briefly stated, the invention comprises foaming a plastic material in expandable condition by the reaction therewithin of finely divided aluminum and a fluoro acid, the acid which gives the best results being fluosilicic $H_2SiF_6$, suitably in the condition of having been generated in situ.

As to materials, the fluoro acid is introduced to advantage in the form of ammonium fluosilicate, also called ammonium silicofluoride. This salt $(NH_4)_2SiF_6$ in contact with the water in the resin composition to be foamed, may be assumed to undergo hydrolysis initially to ammonium hydroxide (or ammonia) and fluosilicic acid. When an aminoplast is the resin used, the formaldehyde available therein withdraws the ammonia from the system, in manner known to promote reaction in the direction producing more of the product so withdrawn. In place of the fluosilicic acid or its ammonium salts there may be used also any water soluble salt of fluosilicic acid, such as Ca, Mg, Sr, Mn, or Pb fluosilicate or a like salt thereof. Said salt when other than ammonium, is used in combination with a water soluble acidic material of which hydrochloric, sulfuric or an alkali metal bisulfate such as sodium hydrogen sulfate are examples.

Also there may be used, as the fluoro compound, hydrofluoric acid or a water soluble fluoride or hydrofluoride of ammonium, sodium, potassium, lithium or other metal whose fluoride is known to be soluble.

The metal fluoride is used in contact with a strong acid such as one of those described above for use with the metal fluosilicates, as in the proportion of equivalent weights. Thus we may use a mixture of approximately 1 mole of sodium fluoride $(Na_2F_2)$ with 2 moles of hydrochloric acid or of sodium hydrogen sulfate or 1 mole of sulfuric acid. The acid component is used in amount to establish the pH below 4 and suitably about 1–3 when the plastic (the resin) is a condensate of urea and formaldehyde and below 1.5 when a condensate of phenol and formaldehyde.

The aluminum used is one that is sufficiently finely divided to give the desired rate of reaction with the selected fluoro compound or mixture thereof with an acidic material. Ordinarily we use any commercial powdered aluminum or flakes.

The resin used is one which is water dispersible and acid-curable, i.e., can be set in the acid condition which must prevail during the generation of the blowing gas. Particularly satisfactory results are had when the resin is an acid-curable aminoplast, e.g., a resinous condensation product of urea with formaldehyde, furfural, or acetaldehyde or of such aldehyde with urea, melamine, thiourea, or like substitutes for urea. There may be used also any phenol formaldehyde condensate of the resole class, these resins being curable by acids of which hydrochloric acid, toluene sulfonyl chloride and sulfuric acid are examples, the hydrochloric being preferred as being economical, satisfactory and giving an easily controlled reaction.

A satisfactory proportion of the fluoro compound is about 0.5%–10% of the dry weight of the resin which is to be foamed and ordinarily 1%–3%.

The amount of the aluminum metal to be used may be and suitably is approximately equivalent to that of the fluoride or fluosilicic compound used, i.e., one atom of aluminum for each three atoms of hydrogen in the fluoro acid selected or provided by said salt after reaction with admixed hydrochloric acid or the like. The decision as to the relative amounts of the aluminum and the fluoro compound is made on the basis of whether it is desired to have an excess of aluminum or of the fluoro compound left unreacted at the end or about an equivalent proportion of each. No disadvantage is found in having left in the foamed plastic a small amount of the fluoro compound, that is either the fluosilicic acid, hydrofluoric acid, or salts thereof. Neither is there any objection to a small amount of unreacted aluminum unless its brightness or color is objectionable in certain uses to which the plastic is to be put. The heat reflecting qualities of excess aluminum flakes is advantageous in heat insulating foams.

To reduce brittleness or hardness of the finished plastic, there may be incorporated a commercial plasticizer in usual amounts as, for example, 5%–100% of the weight of the resin and ordinarily about 10%–30%. Suitable plasticizers are furfuryl alcohol, furfural, diethylene glycol, and the methyl and ethyl ethers of diethylene glycol known as "Methyl Carbitol" and "Carbitol," respectively.

Conventional fillers also may be introduced in usual amounts and for their usual effects.

As to conditions, the aluminum, fluoro compound and the resin are mixed in any convenient and effective manner of distributing the admixtures in the resin. Thus I may stir a concentrated aqueous solution of the acid-curing phenolic or urea formaldehyde resin with the aluminum or the fluoro compound and then admix the other of these reactants. The whole is then maintained in an open vessel or introduced into a closed vented space that is to be filled with foam at the usual curing temperature for the selected resin, as at 15°–100° C., until the resin is cured, during which holding period the fluoro compound will have reacted with the aluminum to develop the necessary hydrogen gas and vesicles in the product.

Once the reactivity of the fluosilicic acid or the hydrofluoric acid, as produced in my reaction on the aluminum has been observed, various explanations may be advanced to explain the mechanism.

I consider an important feature to be the penetration or removal of the protecting film of aluminum oxide which ordinarily coats aluminum surfaces and is not removed by even stronger acid, such as hydrochloric, to the extent that a satisfactory generation of gas may be obtained from aluminum in contact with such stronger acid. It is significant that aqueous ammonium chloride solution, used in the same concentration and under the same conditions as the ammonium fluosilicate, did not give the necessary foaming when mixed with the aluminum powder or flakes; the resin set to a hard mass without visible expansion.

The invention is further illustrated by description in connection with the following specific examples or the practice of it, proportions here and elsewhere herein being expressed as parts by weight unless specifically stated to the contrary.

EXAMPLE 1

100 parts dry weight of a solution of 65% solids concentration of urea formaldehyde condensate was mixed with 75 parts of atomized powdered aluminum and 100 of water. There were then admixed and dissolved in the water 5 parts of ammonium fluosilicate. The mixture foamed strongly over a five minute period and set in the foamed condition at room temperature.

EXAMPLE 2

100 parts of urea formaldehyde resin dispersed in 50 parts of water were mixed with 25 parts of aluminum powder and 25 parts of additional water; to this mixture was added:

(I) 10 parts of 20% $NH_4Cl$ and 10 parts water. The mixture set to a hard silvery resin when held at room temperature. (This product is not an example of the invention.)

(II) 10 parts of 20% $NH_4Cl$, 1 part of 20% $(NH_4)_2SiF_6$ and 9 parts of water. This mixture foamed and set to a solid compact foam with a volume about 3 times that of (I).

(III) 10 parts of 20% $NH_4Cl$, 2 parts of 20% $(NH_4)_2SiF_6$ and 8 parts of water. This mixture foamed to an open foam with a volume about 5 times that of (I).

EXAMPLE 3

100 parts dry weight of the 65% solution of urea formaldehyde condensate are mixed with 15 parts of atomized powdered aluminum and the resulting mixture sprayed into a receiving vessel. At the same time there are sprayed also a solution of 5 parts of ammonium fluosilicate in 10 parts of water. The two sprays are crossed in said vessel, so that the sprays intermingle at 90° C., to give a well distributed, atomized dispersion of the aluminum and fluosilicate in the aqueous resin. Under these circumstances foamed bubbles of cured resin result.

EXAMPLE 4

The procedure and composition of Example 1 are used except that the ammonium fluosilicate is replaced by an equivalent weight of each of the following fluoro compositions, used separately and in turn.

(1) Ammonium fluoride.
(2) Magnesium, strontium, barium, manganese, or lead fluosilicates each in combination with 2 moles of hydrochloric acid for 1 mole of said fluosilicate.

(3) Sodium, potassium, or lithium fluoride or hydrofluoride mixed with 2 moles of hydrochloric acid for each mole of fluoride or 1 mole of the acid for each mole of the hydrofluoride.

The mixing and finishing procedures are exactly as stated in Example 1.

EXAMPLE 5

The procedure and composition of Example 1 are used except that the urea formaldehyde resin is replaced by an equal weight of an acid curing phenol formaldehyde condensate, a resol, made by condensing 2 moles of formaldehyde with 1 mole of phenol in contact with aqueous sodium hydroxide as catalyst.

It will be understood that it is intended to cover all changes and modifications of the examples of the invention herein chosen for the purpose of illustration which do not constitute departures from the spirit and scope of the invention.

I claim:

1. In making a foamed product, the process which comprises mixing an acid-curable, water dispersible plastic selected from a group consisting of amine-aldehyde, and phenolformaldehyde condensates of the resol class in expandable condition with a dispersion of aluminum oxide coated aluminum flakes, in an aqueous solution of ammonium fluosilicate and maintaining said product in expandable condition until the ensuing reaction of the fluosilicate with the aluminum develops gas and produces vesicles in the product.

2. The process of claim 1, said plastic being a urea formaldehyde condensate.

3. In making a foamed product, the process which comprises mixing an acid-curable, water dispersible acid-curable phenol formaldehyde plastic in expandable condition with a dispersion of aluminum oxide coated aluminum flakes, in an aqueous solution of ammonium fluosilicate and maintaining said product in expandable condition until the ensuing reaction of the fluosilicate with the aluminum develops gas and produces vesicles in the product.

References Cited

UNITED STATES PATENTS

| | | |
|---|---|---|
| 2,653,139 | 9/1953 | Sterling. |
| 2,398,703 | 4/1946 | Gardner. |
| 2,664,405 | 12/1953 | Anderson et al. |
| 2,733,221 | 1/1956 | Kish et al. |
| 2,744,875 | 5/1956 | Thomas et al. |

OTHER REFERENCES

Frey College Chemistry, Prentice Hall Publ., 1958, pp. 276–277.

SAMUEL H. BLECH, Primary Examiner

M. FOELAK, Assistant Examiner

U.S. Cl. X.R.

23—210; 260—31.4, 32.8, 33.4